(12) United States Patent
Cho et al.

(10) Patent No.: US 11,871,114 B2
(45) Date of Patent: Jan. 9, 2024

(54) SYSTEM AND METHOD FOR PRODUCING PANORAMIC IMAGE CONTENT

(71) Applicant: Visit Inc., Wonju-si (KR)

(72) Inventors: Yong Won Cho, Seoul (KR); Geun Woong Ryu, Seoul (KR)

(73) Assignee: Visit Inc., Wonju-Si (KR)

( * ) Notice: Subject to any disclaimer, the term of this patent is extended or adjusted under 35 U.S.C. 154(b) by 384 days.

(21) Appl. No.: 16/976,531

(22) PCT Filed: Dec. 16, 2019

(86) PCT No.: PCT/KR2019/017776
§ 371 (c)(1),
(2) Date: Aug. 28, 2020

(87) PCT Pub. No.: WO2021/066254
PCT Pub. Date: Apr. 8, 2021

(65) Prior Publication Data
US 2021/0105406 A1   Apr. 8, 2021

(30) Foreign Application Priority Data

Oct. 4, 2019 (KR) .......................... 10-2019-0123034
Dec. 13, 2019 (KR) .......................... 10-2019-0166683

(51) Int. Cl.
*H04N 23/698* (2023.01)
*G06T 3/40* (2006.01)
(Continued)

(52) U.S. Cl.
CPC ......... *H04N 23/698* (2023.01); *G06T 3/4038* (2013.01); *H04N 1/32128* (2013.01); *H04N 2101/00* (2013.01); *H04N 2201/3253* (2013.01)

(58) Field of Classification Search
CPC .......... H04N 1/32128; H04N 2101/00; H04N 2201/3253; H04N 5/23238; H04N 5/23293; G06T 3/4038
See application file for complete search history.

(56) References Cited

U.S. PATENT DOCUMENTS 8,731,817 B2 * 5/2014 Ballew ................. G01C 21/206
701/428
9,749,809 B2 * 8/2017 Lee ........................ G01S 5/0009
(Continued)

FOREIGN PATENT DOCUMENTS

EP       3451755 A1 *  3/2019  .......... G01C 21/005
KR    10-1613284 B1     4/2016
(Continued)

*Primary Examiner* — Philip P. Dang
(74) *Attorney, Agent, or Firm* — Edwin A. Sisson, Attorney at Law, LLC; John W. Bain

(57) ABSTRACT

The present disclosure relates to a system and a method for producing panoramic image content. The system for producing panoramic image content includes a user device configured to generate first panoramic image data including a first panoramic image and imaging information and a first tag data set including new tag data for at least one object deployed on the first panoramic image; and a panoramic image server including a data receiving module configured to receive the first panoramic image data and the first tag data set from the user device, a tag search module configured to search for at least one pre-stored tag data with respect to the same object existing in a predetermined region based on the imaging information of the first panoramic image data, an object location determination module configured to generate united tag data by calculating a location of the object based on the pre-stored tag data searched for with respect to the same object and the new tag data, and a tag generation module configured to display tag information on the object on the panoramic image data based on the united tag data.

7 Claims, 11 Drawing Sheets

(51) Int. Cl.
*H04N 1/32* (2006.01)
*H04N 101/00* (2006.01)

(56) References Cited

U.S. PATENT DOCUMENTS

| | | | |
|---|---|---|---|
| 9,874,308 B2* | 1/2018 | Saika | F16M 13/02 |
| 9,998,661 B1* | 6/2018 | Banta | H04N 23/698 |
| 10,094,903 B2* | 10/2018 | Lowry | H04N 23/698 |
| 10,134,298 B2* | 11/2018 | Tao | G09B 9/46 |
| 10,452,106 B2* | 10/2019 | Cho | G06F 1/1656 |
| 10,694,141 B2* | 6/2020 | Kaneko | H04N 7/188 |
| 10,839,492 B2* | 11/2020 | Scott | H04W 4/029 |
| 10,848,670 B2* | 11/2020 | Gatti | B60R 25/33 |
| 10,848,731 B2* | 11/2020 | Simek | H04N 13/106 |
| 11,089,213 B2* | 8/2021 | Hasegawa | G11B 27/322 |
| 11,145,116 B2* | 10/2021 | Frank | H04N 13/282 |
| 11,430,178 B2* | 8/2022 | Pystynen | G06T 15/205 |
| 2012/0147041 A1* | 6/2012 | Jang | H04N 1/00315 |
| | | | 345/633 |
| 2014/0327580 A1* | 11/2014 | Rautiainen | G01S 5/08 |
| | | | 342/385 |
| 2016/0169662 A1* | 6/2016 | Lim | G01B 11/14 |
| | | | 348/142 |
| 2016/0363455 A1* | 12/2016 | Masutani | G08G 1/096827 |
| 2018/0197139 A1* | 7/2018 | Hill | G06Q 10/0838 |
| 2019/0149725 A1* | 5/2019 | Adato | H04N 1/00 |
| | | | 348/158 |

FOREIGN PATENT DOCUMENTS

| | | |
|---|---|---|
| KR | 10-1715828 B1 | 3/2017 |
| KR | 10-1867594 B1 | 6/2018 |
| KR | 10-1909194 B1 | 10/2018 |
| KR | 10-1992477 B1 | 6/2019 |

* cited by examiner

FIG. 11A Imaging Information

| |
|---|
| Image Name |
| File Type |
| Image File Name |
| Image Height |
| Image Width |
| Imaging Range |
| Object Location GPS Data 1 |
| Object Location GPS Data 2 |
| Image Time |
| Camera Information |
| Image Data Storage Location |
| Search Result Information |
| Region 1 Data |
| First Parameter |
| Second Parameter |
| Third Parameter |

FIG. 11B Tag Data Set

| |
|---|
| Image Name |
| Object Location GPS Data 1 |
| Object Location GPS Data 2 |
| Pitch Information |
| Roll Information |
| Yaw Information |
| Imaging Origin x y z |
| Object Name |
| Object Location x y z |
| Identification Region x y z |
| Average Value of Intersection Pts. |
| Object Average Point x y z |
| Reference Intersection Point x y z |
| Reference Intersection Point x y z |
| Reference Tag Coordinate x y z |
| Reference Tag Coordinate x y z |

FIG. 11C Pre-Stored Tag Data / New Tag Data

| |
|---|
| Object Name |
| Information Set # |
| Image File |
| Object Location GPS Data 1 |
| Object Location GPS Data 2 |
| Object Location #1 x y z |
| Object Pitch #1 |
| Object Roll #1 |
| Object Yaw #1 |
| Deployment Direction #1 |
| Connection Line #1 Information |
| Marker #1 location |
| Tag Deployment Direction |
| Tag Deployment Location |
| Image Name |
| Object Name |
| Object Location Information |
| Location First Parameter |
| Location Second Parameter |
| Location Third Parameter |

FIG. 11D United Tag Data

| |
|---|
| User Identification |
| User Location |
| Imaging Origin x y z |
| Object #1 Name |
| Object #1 x y z |
| Imaging Object Range |
| Object Tag Data |
| Average Extension Intersection Data |
| Pre-Stored Data #1 Name |
| Pre-Stored Data #2 Name |
| New Object Tag Data |
| New Object Tag Data |
| Search Content / Link |
| UT Location on Image |
| Tag Deployment Direction |
| Location Information Set ID |
| Weighted UT Information |
| Connection Line Information |
| Imaging Composition Information |
| Viewing Angle Region Information |
| Extension Intersection Information |
| Geometric Image Information |
| Location Information |

SYSTEM AND METHOD FOR PRODUCING PANORAMIC IMAGE CONTENT

CROSS-REFERENCE TO RELATED APPLICATION

This application claims priority to Korean Patent Application No. 10-2019-0123034, filed on 4 Oct. 2019; Korean Patent Application No. 10-2019-0166683, filed on 13 Dec. 2019; and International Patent Application No. PCT/KR2019/017776, filed on 16 Dec. 2019, the teachings of each of which are incorporated herein by reference in their entirety.

BACKGROUND OF THE DISCLOSURE

Field of the Disclosure

The present disclosure relates to a system and a method for producing panoramic image content.

Description of Related Art

With the spread of VR devices and 5G communication technologies, environments have been provided, in which virtual content for places related to tourism, real estate, and the like can be experienced.

In general, there has been a method for producing virtual content through a separate image processing procedure after regional images are shot by separate shooting personnel with a 360° imaging device and a vehicle.

However, the method for producing virtual content as described above has cumbersome problems of causing enormous cost and time to be put, being unable to provide data in a place that the vehicle is unable to enter, and being able to produce the virtual content through performing of a separate image edition by an image expert.

SUMMARY OF THE DISCLOSURE

An aspect of the present disclosure is to provide a system and a method for enabling a user to easily produce panoramic image content based on shot image information.

In one embodiment of the present disclosure, a system for producing panoramic image content includes a user device configured to generate first panoramic image data including a first panoramic image and imaging information and a first tag data set including new tag data for at least one object deployed on the first panoramic image; and a panoramic image server including a data receiving module configured to receive the first panoramic image data and the first tag data set from the user device, a tag search module configured to search for at least one pre-stored tag data with respect to the same object existing in a predetermined region based on the imaging information of the first panoramic image data, an object location determination module configured to generate united tag data by calculating a location of the object based on the pre-stored tag data searched for with respect to the same object and the new tag data, and a tag generation module configured to display tag information on the object on the panoramic image data based on the united tag data.

The pre-stored tag data and the new tag data may include imaging origin information on a location in which the panoramic image is shot and object location information on an individual object, an extension line may be formed to extend from a connection line connecting an imaging origin based on one piece of the imaging origin information and an object location based on one piece of the object location information to each other, and the object location determination module may be configured to calculate the location of the object by an average value of intersection points among a plurality of extension lines being formed based on at least one piece of the pre-stored tag data and a location information set of the new tag data.

The object location determination module may be configured to determine a number of location information sets of the pre-stored tag data searched for with respect to the same object, the imaging origin information and the object location information may include a first parameter, a second parameter, and a third parameter for the location, the object location determination module may be configured to generate the united tag data using the average value of the intersection points of the extension lines with respect to the same object being formed based on the first to third parameters of the imaging origin information and the object location information in case that there are two or more location information sets of the pre-stored tag data searched for by the panoramic image server with respect to the same object, and the object location determination module may be configured to generate the united tag data using the average value of the intersection points of the extension lines with respect to the same object being formed based on the first and second parameters of the imaging origin information and the object location information in case that there is one location information set of the pre-stored tag data searched for by the panoramic image server with respect to the same object.

In case that there are the two or more location information sets of the pre-stored tag data searched for with respect to the same object, the panoramic image server may be configured to generate an identification region surrounding the plurality of intersection points and an object average point based on the average value of the intersection points, and to generate 3D model data of the object being deployed on the panoramic image based on the identification region.

The object average point based on the average value may be deployed in a center of the identification region, and a size of the identification region may be in proportion to variances of the intersection points.

The intersection point being located in a distance that is larger than a predetermined distance from the object average point based on the average value may be excluded from the identification region.

The imaging origin information and the object location information may include the first parameter, the second parameter, and the third parameter for the location, and the object location determination module may be configured to determine the number of location information sets of the pre-stored tag data searched for with respect to the same object, to generate the intersection points of the extension lines with respect to the same object being formed based on the first parameter and the second parameter of the imaging origin information and the object location information in case that there are two or more location information sets of the pre-stored tag data searched for with respect to the same object, and to generate the united tag data using the average value of values of the extension lines on which the intersection point meets a straight line of the third parameter vertically extending in a direction of the third parameter.

The user device may include an imaging unit configured to generate the first panoramic image; an imaging information generation unit configured to generate the first panoramic image data including the first panoramic image and the imaging information; a communication unit configured to transmit the first panoramic image data from the user device to the panoramic image server; and an input unit configured to receive tag information of the new tag data based on tag information of the pre-stored tag data or to directly receive the tag information of the new tag data from a user.

The panoramic image server may further include a reward module configured to generate reward reference data in consideration of at least one of pre-stored panoramic image data existing in the predetermined region and the pre-stored tag data based on the first panoramic image data and the new tag data, and to provide imaging reward for the first panoramic image data and the new tag data based on the reward reference data.

The reward module may be configured to calculate an expected imaging reward based on user location information that is location information of the user device and the reward reference data, and to transmit the expected imaging reward to the user device, and the user device may include an output unit configured to display the expected imaging reward received by the user device.

The pre-stored tag data and the new tag data may include imaging origin information on a location in which the panoramic image is shot and object location information on an individual object, and the reward reference data may include at least one reference of imaging range information on the object pre-stored based on the pre-stored panoramic image data and the pre-stored tag data, a distance between an imaging origin based on the imaging origin information and the object location based on the object location information, a number of pieces of the pre-stored tag data with respect to the object, the imaging information, and user information of the user device.

The tag generation module may be configured to display the united tag data on the first panoramic image data and pre-stored panoramic image data respectively linked to a plurality of pieces of object reference information including the same tag information.

The user device may further include a location correction module configured to correct the first tag data set based on an image processing result of the first panoramic image data.

In one embodiment of the present disclosure, a method for producing panoramic image content using a system for producing panoramic image content including a user device generating panoramic image data and tag data and a panoramic image server receiving the panoramic image data and the tag data from the user device includes generating a panoramic image which generates, by the user device, first panoramic image data including a first panoramic image and imaging information and a first tag data set including new tag data for at least one object deployed on the first panoramic image; calculating an object location which generates, by the panoramic image server, united tag data by receiving the first panoramic image data and the first tag data set from the user device, searching for at least one pre-stored tag data with respect to the same object existing in a predetermined region based on the imaging information of the first panoramic image data, and calculating a location of the object based on the pre-stored tag data searched for with respect to the same object and the new tag data; and displaying a panoramic image which displays, by the panoramic image server, tag information on the object on the panoramic image data based on the united tag data.

The pre-stored tag data and the new tag data may include imaging origin information on a location in which the panoramic image is shot and object location information on an individual object, an extension line may be formed to extend from a connection line connecting an imaging origin based on one piece of the imaging origin information and an object location based on one piece of the object location information to each other, and the calculating of the object location may include calculating, by the panoramic image server, the location of the object by an average value of intersection points among a plurality of extension lines being formed based on at least one piece of the pre-stored tag data and a location information set of the new tag data.

The imaging origin information and the object location information may include a first parameter, a second parameter, and a third parameter for the location, and the calculating of the object location may include: determining a tag data which determines, by the panoramic image server, a number of location information sets of the pre-stored tag data searched for with respect to the same object; calculating a 3D tag coordinate which generates, by the panoramic image server, the united tag data using the average value of the intersection points of the extension lines with respect to the same object being formed based on the first to third parameters of the imaging origin information and the object location information in case that there are two or more location information sets of the pre-stored tag data searched for with respect to the same object; and calculating a 2D tag coordinate which generates, by the panoramic image server, the united tag data using the average value of the intersection points of the extension lines with respect to the same object being formed based on the first and second parameters of the imaging origin information and the object location information in case that there is one location information set of the pre-stored tag data searched for with respect to the same object.

The calculating of the object location may further include: generating a 3D object modeling data which generates, by the panoramic image server, an identification region surrounding the plurality of intersection points and an object average point based on the average value of the intersection points in case that there are the two or more location information sets of the pre-stored tag data searched for with respect to the same object; and generates 3D model data of the object being deployed on the panoramic image based on the identification region.

The object average point based on the average value may be deployed in a center of the identification region, and a size of the identification region may be in proportion to variances of the intersection points.

The intersection point being located in a distance that is larger than a predetermined distance from the object average point based on the average value may be excluded from the identification region.

The calculating of the object location may include: generating the intersection points of the extension lines with respect to the same object being formed based on the first parameter and the second parameter of the imaging origin information and the object location information in case that there are two or more location information sets of the pre-stored tag data searched for with respect to the same object; and generating the united tag data using the average value of values of the extension lines on which the intersection point meets a straight line of the third parameter vertically extending in a direction of the third parameter.

The generating of the panoramic image may include: imaging a panoramic image which generates, by the user device, the first panoramic image and the first panoramic image data including the first panoramic image and the imaging information; transmitting an image and imaging data which transmits, by the user device, the first panoramic image data to the panoramic image server; determining an existing image data existence which determines existence/nonexistence of the pre-stored panoramic image data existing in the predetermined region based on the first panoramic image data; determining a tag information input which inputs, by the user device, tag information of the new tag data based on tag information of the pre-stored tag data in case that the pre-stored panoramic image data exists in the predetermined region based on the first panoramic image data; and inputting an initial tag data which directly receives the tag information of the new tag data from a user in case that the pre-stored panoramic image data does not exist in the predetermined region based on the first panoramic image data or the user device does not input the tag information of the new tag data based on the tag information of the pre-stored tag data.

The generating of the panoramic image may include: providing rewards which generates reward reference data in consideration of at least one of pre-stored panoramic image data existing in the predetermined region and the pre-stored tag data based on the first panoramic image data and the new tag data; and provides imaging reward for the first panoramic image data and the new tag data based on the reward reference data.

The method may further include: identifying a reward which calculates, by the panoramic image server, an expected imaging reward based on user location information that is location information of the user device and the reward reference data; transmits the expected imaging reward to the user device; and displays the expected imaging reward received by the user device.

The pre-stored tag data and the new tag data may include imaging origin information on a location in which the panoramic image is shot and object location information on an individual object, and the reward reference data may include at least one reference of imaging range information on the object pre-stored based on the pre-stored panoramic image data and the pre-stored tag data, a distance between an imaging origin based on the imaging origin information and the object location based on the object location information, a number of pieces of the pre-stored tag data with respect to the object, the imaging information, and user information of the user device.

The displaying of the panoramic image may include displaying, by the panoramic image server, the united tag data on the first panoramic image data and pre-stored panoramic image data respectively linked to a plurality of pieces of object reference information including the same tag information.

The generating of the panoramic image may further include correcting a tag location which corrects, by the user device, the first tag data set based on an image processing result of the first panoramic image data.

The proposed embodiment has an effect that the user can easily produce the panoramic image content based on the imaging information shot by a user.

DESCRIPTION OF SPECIFIC EMBODIMENTS

Figure 1:
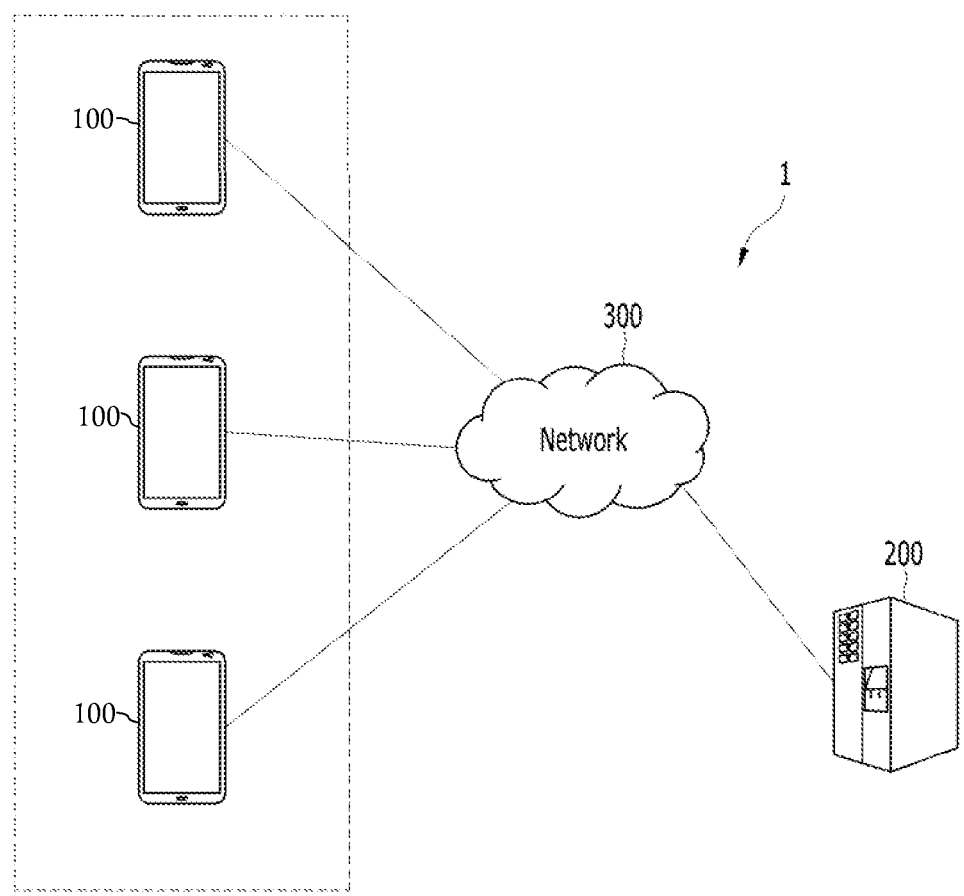
FIG. 1 is a diagram schematically illustrating the configuration of a system for producing panoramic image content according to an embodiment of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, and it can be implemented in diverse forms. The embodiments are only specific details provided to assist those of ordinary skill in the art in a comprehensive understanding of the disclosure, and the present disclosure is only defined within the scope of the appended claims.

Although such terms as "1st" and "2nd," or "first" and "second" are used to describe various constituent elements, it is apparent that such constituent elements are not limited by the terms. The terms are used to simply distinguish a corresponding constituent element from another. Of course, a first constituent element, as mentioned herein, may also be a second constituent element within the technical idea of the present disclosure.

In the entire description of the present disclosure, the same drawing reference numerals are used for the same elements across various figures.

Respective features of several embodiments of the present disclosure can be partially or entirely coupled to or combined with each other, and as those skilled in the art can fully understand, various types of interlocking and driving are possible in technology, and the respective embodiments can be implemented independently or in association with each other.

Meanwhile, tentative effects that can be expected by the technical features of the present disclosure, which have not been specifically mentioned in the specification of the present disclosure, are treated as described in the specification of the present disclosure, and the present embodiment is provided to explain the present disclosure more completely to those having average knowledge in the art to which the present disclosure pertains. Accordingly, the contents illustrated in the drawings may be expressed to be exaggerated as compared with the actual implementation shape of the present disclosure, and the detailed explanation of the configuration, which may be determined to unnecessarily obscure the gist of the present disclosure, will be omitted or simplified.

Hereinafter, with reference to the accompanying drawings, embodiments of the present disclosure will be described in detail so that those of ordinary skill in the art to which the present disclosure pertains can easily embody the same. The present disclosure may be implemented in various different forms, and thus is not limited to the embodiments disclosed hereinafter. In the drawings, for clear explanation of the present disclosure, technical contents that are not directly related to the explanation will be omitted, and in the entire description of the present disclosure, the same drawing reference numerals are used for the same or similar elements across various figures. Further, sizes and thicknesses of respective constituent elements illustrated in the drawings may be randomly illustrated for convenience in explanation, and thus they are not limited to those as illustrated.

In the present disclosure, the term "on" means a location on or below a target member, but does not necessarily mean a location on an upper part of the target member based on a gravity direction. Further, in the entire description, when a certain portion is referred to as "including" a certain constituent element, it means that other constituent elements are not excluded, but other constituent elements can be further included unless specially described on the contrary. Further, in the specification, the term "unit" includes a unit realized by hardware, a unit realized by software, or a unit realized using both hardware and software. Further, one unit may be realized using two or more pieces of hardware, or two or more units may be realized by one piece of hardware.

First, referring to FIG. 1, a system 1 for producing panoramic image content according to an embodiment of the present disclosure includes a user device 100, a panoramic image server 200, and a network 300.

The user device 100 may be an electronic device that generates a panoramic image by imaging an image. For example, the user device may be an electronic device that generates a panoramic image using a VR camera, a 360° camera, an omnidirectional camera, a plurality of cameras, and so forth, or an electronic device including a panoramic generation application which shoots a plurality of images and generates a panoramic image based on the plurality of the shot images. Further, the user device may be a smart phone having a camera function capable of including imaging information, a tablet PC, a personal digital assistant (PDA), a computing device including a handheld device having other radio access functions, or an imaging device capable of including location information, such as a processing device connected to other wireless modems. The present disclosure is not limited thereto.

The panoramic image server 200 may generate united tag data (UT) with respect to the same object based on the panoramic image I shot by user devices 100 and imaging information $I_D$.

Here, the panoramic image I includes a first panoramic image $I_1$ received from the user device 100 and a pre-stored panoramic image $I_S$ shot prior to the first panoramic image and stored in the panoramic image server 200.

Further, the tag data TD includes new tag data $TD_1$ for an object deployed on the first panoramic image $I_1$ shot by the user device 100 and pre-stored tag data $TD_S$ for an object deployed on the pre-stored panoramic image shot prior to the first panoramic image and stored in the panoramic image server 200.

Further, the panoramic image server 200 may generate the united tag data UT including imaging origin information SI and object location information OI of the pre-stored tag data $TD_S$ and imaging origin information SI and object location information OI of the new tag data $TD_1$ with respect to the same object.

In this case, if the panoramic image server 200 receives newly new tag data $TD_N$ with respect to the same object, the united tag data UT may be the pre-stored tag data $TD_S$ that was first stored, and it is possible to update the united tag data UT including the imaging origin information SI and the object location information OI of the newly new tag data $TD_N$.

Further, the panoramic image server 200 may receive, from an external server, weather information and specific situation information in accordance with time or location information of the panoramic image I, and may store the received information therein.

The panoramic image server 200 may provide a general search service and other various services for promoting user's convenience in addition to the service for producing the panoramic image content. That is, the panoramic image server 200 may provide various services, such as search, e-mail, blog, social network service, news, and shopping information providing. Although FIG. 1 illustrates one server, a plurality of servers may exist to be mutually connected by wired/wireless communication in accordance with the amount of access or the amount of data.

In the system 1 for producing the panoramic image content as described above, the user device 100 and the panoramic image server 200 may be connected to each other via a network 300.

The network 300 may be a communication path enabling the user device and the panoramic image server to perform wired/wireless communication with each other. For example, the network 300 may cover a wired network, such as local area network (LAN), wide area network (WAN), metropolitan area network (MAN), or integrated service digital network (ISDN), or a wireless network, such as wireless LAN, cellular communication network, CDMA, Bluetooth, or satellite communication, but the scope of the present disclosure is not limited thereto.

Figure 2:
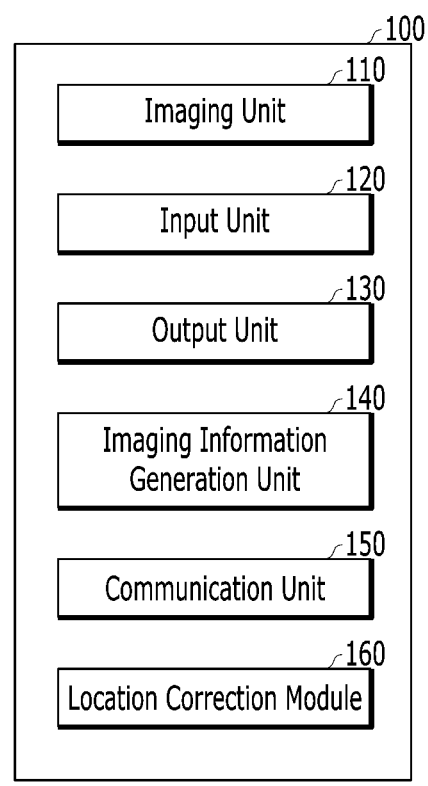
FIG. 2 is a block diagram schematically illustrating the configuration of a user device of a system for producing panoramic image content of FIG. 1.

FIG. 2 is a block diagram schematically illustrating the configuration of a user device 100 of a system for producing panoramic image content of FIG. 1.

Referring to FIG. 2, the user device 100 according to an embodiment of the present disclosure may include an imaging unit 110, an input unit 120, an output unit 130, an imaging information generation unit 140, a communication unit 150, and a location correction module 160.

The user device 100 may generate first panoramic image data $ID_1$ including a first panoramic image $I_1$ and imaging information and a first tag data set $DS_1$ including new tag data $TD_1$ with respect to at least one object deployed on the first panoramic image $I_1$.

Further, the first panoramic image $I_1$ may be a still image or a moving image shot through the user device 100 at 360° or in a panoramic form.

In this case, the imaging information may include information on an imaging environment in which the first panoramic image $I_1$ is shot, such as location information where the first panoramic image $I_1$ is shot, imaging time, and imaging camera information, or may include external information on weather information and specific situation information searched for by an external server based on the location information or the imaging time.

The imaging unit 110 may generate the first panoramic image $I_1$.

Specifically, the imaging unit 110 may be a single camera module or a plurality of camera modules, but this is merely an exemplary configuration, and the imaging unit may be an imaging module included in various electronic devices for shot images or moving images.

The input unit 120 may receive the tag information of the new tag data $TD_1$ based on the tag information of the pre-stored tag data $TD_S$, or may directly receive the tag information of the new tag data $TD_1$ from a user.

The output unit 130 may output data received by the user device 100 from the panoramic image server 200, or the first panoramic image $I_1$ shot by the user device 100.

Further, the output unit 130 may display the tag information on the object deployed on the panoramic image I.

Further, the output unit 130 may display the pre-stored panoramic image data $ID_S$, the pre-stored tag data $ID_S$ of the pre-stored panoramic image data $ID_S$, or the united tag data UT on a geographic information image.

In this case, the geographic information image may be a 2D or 3D image capable of exemplarily displaying a map and topography.

More specifically, the output unit 130 may display, on the geographic information image, a tag deployment direction MV (refer to FIG. 8) that is a deployment direction of the pre-stored tag data $TD_S$ deployed on the pre-stored panoramic image $I_S$ using the imaging origin information SI and the object location information OI of the pre-stored tag data $TD_S$.

Because the output unit 130 displays, on the geometric information image, the deployment direction of the tag information deployed on the pre-stored panoramic image $I_S$, the user can easily grasp the location in which favorable imaging reward IR or expected imaging reward PR can be provided.

Exemplarily, the output unit 130 displays a location marker M, which is location information where the pre-stored panoramic image data $ID_S$ is shot, on the geometric information image in the form of an icon, a marker, and a tag. In this case, the output unit may display the tag deployment direction MV (refer to FIG. 8) in a specific region of the location marker M, and the tag deployment direction MV may be displayed with various signs indicating segments and directions.

Further, the output unit 130 may display the tag information of the united tag data UT on the geometric information image based on the location information sets of the united tag data UT.

Because the output unit 130 displays the tag information of the united tag data UT on the geometric information image, the user can grasp the panoramic image obtained by imaging the object corresponding to the tag information and information of the object corresponding to the tag information.

The output unit 130 may display the expected imaging reward PR received by the user device 100 from the panoramic image server 200.

The output unit 130 may be formed of a liquid crystal display (LCD), organic light emitting diodes (OLED), and active matrix organic light emitting diodes (AMOLED). However, this is merely an exemplary configuration, and the output unit may be composed of various display devices for displaying images using other methods.

The imaging information generation unit 140 may generate the first panoramic image data $ID_1$ including the first panoramic image $I_1$ and imaging information $I_D$.

In this case, the imaging information ID includes information on the imaging environment in which the first panoramic image $I_1$ is shot, such as location information in which the first panoramic image $I_1$ is shot, imaging time, and camera information.

Further, the imaging information $I_D$ may include external information on the location information or time information received from an external server.

The communication unit 150 may transmit the first panoramic image data $ID_1$ from the user device 100 to the panoramic image server 200.

The communication unit 150 may communicate with panoramic image servers 200 in a wired/wireless communication method through the network 300.

For example, the communication unit 150 may implement a certain one of plural wireless standards or protocols including not only IEEE 802.11, IEEE 702.20, GPRS (General Packet Radio Service), Ev-DO (Evolution Data Optimized), HSPA+ (Evolved High Speed Packet Access), HSDPA+ (Evolved High Speed Downlink Packet Access), HSUPA+ (Evolved High Speed Uplink Packet Access), GSM (Global System for Mobile Communications), EDGE (Enhanced Data rates for GSM Evolution), CDMA (Code Division Multiple Access), TDMA (Time Division Multiple Access), DECT (Digital Enhanced Cordless Telecommunications), LTE (Long Term Evolution), Zigbee, NFC (Near field Communication), RF (Radio Frequency), Bluetooth, and their derivatives, but also certain other radio protocols (but is not limited thereto) designated as 3G, 4G, 5G, or more.

The location correction module 160 may correct the first tag data set $DS_1$ based on the image processing result of the first panoramic image data $ID_1$.

In this case, the location correction module 160 may guide or correct to properly deploy the object on the first panoramic image $I_1$ using at least one of object recognition methods, such as colors of the first panoramic image $I_1$ and complexity of an object shape. However, the object recognition methods included in the panoramic image I are not limited thereto, and any one of known object recognition methods may be used.

Exemplarily, the location correction module 160 may perform object recognition of the first panoramic image $I_1$, and may determine the center of gravity of an object recognition region corresponding to the object deployed on the first panoramic image $I_1$ to correct the deployed object.

Figure 3:
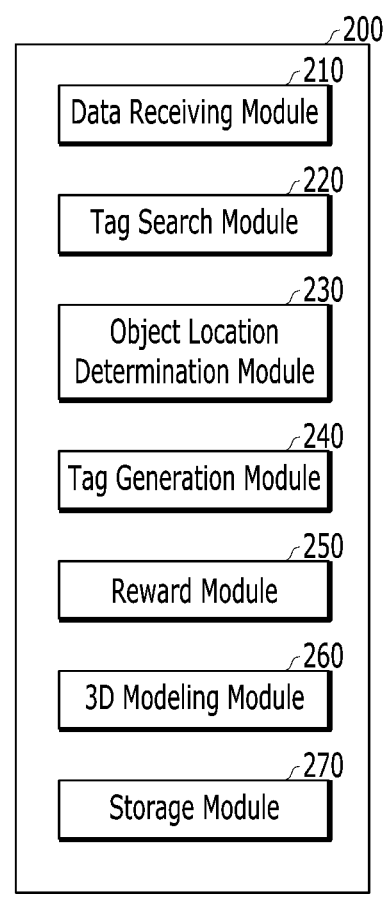
FIG. 3 is a block diagram schematically illustrating the configuration of a panoramic image server of a system for producing panoramic image content of FIG. 1.

FIG. 3 is a block diagram schematically illustrating the configuration of a panoramic image server of a system for producing panoramic image content of FIG. 1.

Referring to FIG. 3, a panoramic image server 200 includes a data receiving module 210, a tag search module 220, an object location determination module 230, a tag generation module 240, a reward module 250, a 3D modeling module 260, and a storage module 270.

The data receiving module 210 may receive the first panoramic image data $ID_1$ and the first tag data set $DS_1$ from the user device 100.

The tag search module 220 may search for at least one piece of pre-stored tag data $TD_S$ with respect to the same object existing in a predetermined region $R_1$ based on the imaging information of the first panoramic image data $ID_1$.

In this case, the predetermined region $R_1$ may be a region in accordance with a distance predetermined by the user based on the imaging information included in the first panoramic image data $ID_1$, and may be a specific region for a point or a place having the same alias included in the imaging information $I_D$.

For example, the predetermined region $R_1$ may be a spaced radius distance based on the imaging location included in the first panoramic image data $ID_1$ or an administrative area having the same alias, a landmark, or a specific area based on a building name.

The tag search module 220 may search for the pre-stored tag data $TD_S$ included in the storage unit of the panoramic image server 200 based on the imaging information included in the first panoramic image data $ID_1$ or the pre-stored tag data $TD_S$ from an external server.

The object location determination module 230 may generate the united tag data UT by calculating the location of the object based on the pre-stored tag data $TD_S$ searched for with respect to the same object and new tag data $TD_1$.

Specifically, the object location determination module 230 may calculate the location of the object by an average value of intersection points P among a plurality of extension lines being formed based on at least one piece of the pre-stored tag data $TD_S$ and a location information set of the new tag data $TD_1$.

In this case, the pre-stored tag data $TD_S$ and the new tag data $TD_1$ may include imaging origin information SI on the location in which the panoramic image I is shot and object location information OI on an individual object, and an extension line V may be formed to extend from a connection line connecting an imaging origin based on one piece of the imaging origin information SI and an object location based on one piece of the object location information OI to each other.

Here, the imaging origin information SI may be generated, for example, based on the imaging location information provided from a satellite navigation system or various methods capable of measuring the imaging location of the user device 100.

Further, the object location information OI may be generated as location information of the object deployed on the panoramic image I based on, for example, yaw, pitch, and roll values, but is not limited thereto, and may be expressed by various coordinate systems implemented on the panoramic image I.

The object location determination module 230 may determine the number of location information sets of the pre-stored tag data $TD_S$ searched for with respect to the same object.

In this case, the imaging origin information SI and the object location information OI may include a first parameter, a second parameter, and a third parameter for the location.

Specifically, the first parameter, the second parameter, and the third parameter may be respective parameters corresponding to a 3D rectangular coordinate system composed of three axes.

The object location determination module 230 may generate the united tag data UT using the average value of the intersection points P of the extension lines V with respect to the same object being formed based on the first to third parameters of the imaging origin information SI and the object location information OI in case that there are two or more location information sets of the pre-stored tag data $TD_S$ searched for by the panoramic image server 200 with respect to the same object.

Further, the object location determination module 230 may correct the united tag data UT by applying weight factors W to the respective intersection points P.

The weight factor W may be calculated based on at least one of imaging information of the panoramic image data ID linked to the tag data TD for generating the respective intersection points P and user information of the user device 100 imaging the panoramic image data ID.

Accordingly, the first parameter X and the second parameter Y of the united tag data UT may be expressed as in mathematical expression 1.

$$\left( \frac{\sum [w_n \{x_n - \text{means}(x)\}]}{n} + \text{means}(x), \right.$$
$$\left. \frac{\sum [w_n \{y_n - \text{means}(y)\}]}{n} + \text{means}(y) \right)$$
$$UT(X, Y)$$

[Mathematical expression 1]

By correcting the united tag data UT through application of the weight factors W based on at least one of the imaging information and the user information, it is possible to correct the location of the object of the united tag data UT calculated from the tag data TD that may be incorrect depending on the user reliability of the user device 100, weather information, and time information. Further, in case that the object location determination module 230 performs correction of the third parameter Z of the united tag data, although the third parameter Z is not illustrated, the third parameter Z may be applied together with the first parameter X and the second parameter Y, and the corrected united tag data may be generated.

The object location determination module 230 may generate the united tag data UT using the average value of the intersection points P of the extension lines V with respect to the same object being formed based on the first and second parameters of the imaging origin information SI and the object location information OI in case that there is one location information set of the pre-stored tag data $TD_S$ searched for by the panoramic image server 200 with respect to the same object.

Further, in case that there are two or more location information sets of the pre-stored tag data $TD_S$ searched for with respect to the same object, the object location determination module 230 may generate the intersection points P of the extension lines V with respect to the same object being formed based on the first and second parameters of the imaging origin information SI and the object location information OI, and may generate the united tag data UT using the average value of the values of the extension lines V on which the intersection point P meets a straight line of the third parameter vertically extending in a direction of the third parameter.

By considering the third parameter after generating the intersection points P by first forming the extension lines V being formed based on the first and second parameters of the imaging origin information SI and the object location information OI, the intersection points P with respect to the same object are essentially generated, and the tag information of the united tag data UT with respect to the same object can be accurately displayed on a plurality of panoramic images I.

Further, as the pre-stored tag data $TD_S$ generated by a plurality of user devices 100 is accumulated, more extension lines V and intersection points P are formed, and thus it is advantageous that the location of the tag information with respect to the object can be accurately deployed or displayed on the plurality of panoramic images.

In case of using N pieces of pre-stored tag data $TD_S$, the number n of extension lines being generated and the number P of the maximum extension line intersection points may be expressed as in mathematical expression 2.

$$N = n, P = 1 + 2 + \ldots + (n-1) = \frac{n(n-1)}{2},$$
$$(n \geq 2)$$

[Mathematical expression 2]

The tag generation module 240 may display the tag information with respect to the object on the panoramic image I based on the united tag data UT.

Specifically, the tag generation module 240 may display the tag information of the united tag data UT on the first panoramic image data $ID_1$ and the pre-stored panoramic image data $ID_S$ respectively related to plural pieces of object reference information RI including the same tag information.

The object reference information RI may include a storage location of the panoramic image data ID linked to the tag information and file information of the panoramic image data ID.

The reward module 250 may generate reward reference data CD in consideration of at least one of pre-stored panoramic image data $ID_S$ existing in the predetermined region and the pre-stored tag data $TD_S$ based on the first panoramic image data $ID_1$ and the new tag data $TD_1$, and may provide imaging reward IR for the first panoramic image data $ID_1$ and the new tag data $TD_1$ to the user device 100 based on the reward reference data CD.

Further, the reward module 250 may calculate an expected imaging reward PR based on user location information that is location information of the user device 100 and the reward reference data CD, and may provide the expected imaging reward PR to the user device 100.

The user location information may be the current location measured by the user device 100 or a location for imaging the first panoramic image $I_1$.

In this case, the reward reference data CD may include at least one reference of imaging composition information of the object pre-stored based on the pre-stored panoramic image data $ID_S$ and the pre-stored tag data $TD_S$, a distance between the imaging origin based on the imaging origin information SI and the object location based on the object location information OI, the number of pieces of pre-stored tag data $TD_S$ with respect to the object, imaging information $I_D$, and user information of the user device 100.

The imaging composition information of the object may be generated based on the location information of the user device 100 and the object imaging range information for imaging the object deployed on the first panoramic image $I_1$.

The object imaging range information may be an object area range being displayed on the panoramic image I or object composition information being shown on the panoramic image I.

Further, the imaging composition information of the object makes it possible to generate a viewing angle region having a radius corresponding to a distance between the imaging origin based on the imaging origin information SI and the object location based on the object location information OI, and to calculate a ratio of the viewing angle region to a circumference overlapping the object.

In this case, the object location may be GPS information of the object received from an external server and object location information OI where the tag information generated as the united tag data UT is deployed.

Further, the reward module 250 may give reward weights of the imaging reward IR and the expected imaging reward PR to the user device 100 through comparison of viewing angles with respect to the same object on the pre-stored panoramic image $I_S$ searched for by the tag search module 220.

Further, the reward module 250 may identify the user information of the user device 100, and may give the reward weights of the imaging reward IR and the expected imaging reward PR to the user device 100 through evaluation of qualities of the first panoramic image data $ID_1$ shot by the user based on the user information, the pre-stored panoramic image data $ID_S$, the new tag data $TD_1$, and the pre-stored tag data $TD_S$.

The reward module 250 may provide block chain based virtual currency and points to the user device 100 based on the reward weights and reward reference data CD.

In case that there are two or more location information sets of the pre-stored tag data $TD_S$ searched for with respect to the same object, the 3D modeling module 260 may generate an identification region surrounding the plurality of intersection points P and an object average point based on the average value of the intersection points P, and may generate 3D model data of the object being deployed on the panoramic image I based on the identification region.

In this case, the object average point based on the average value may be deployed in a center of the identification region, and the size of the identification region may be in proportion to variances of the intersection points P. Through this, the size of the object can be appropriately determined in more realistic manner.

Further, the intersection point being located in a distance that is larger than a predetermined distance from the object average point based on the average value may be excluded from the identification region.

In this case, by excluding the intersection point located in the distance that is larger than the predetermined distance, an error can be reduced in the process of generating the 3D model data.

The predetermined distance from the object average point may be a distance of the recognized object or a specific distance set by the user.

The storage module 270 may store the pre-stored panoramic image data $ID_S$, the tag for the pre-stored panoramic image data $ID_S$, and the pre-stored tag data $TD_S$ that is the tag location information.

Further, the storage module 270 may store the united tag data UT generated by the object location determination module 230.

In this case, in case that the panoramic image server 200 receives the first tag data set $DS_1$ and the tag search module 220 searches for the pre-stored tag data $TD_S$, the storage module 270 may transmit the united tag data UT that is the pre-stored tag data $TD_S$ with respect to the same object existing in the predetermined region to the object location determination module 230 based on the result of the search, regenerate the united tag data UT by calculating the location of the object based on the pre-stored tag data $TD_S$ and the new tag data $TD_1$ transmitted to the object location determination module 230, and store the regenerated data in the storage module 270.

Figure 4:
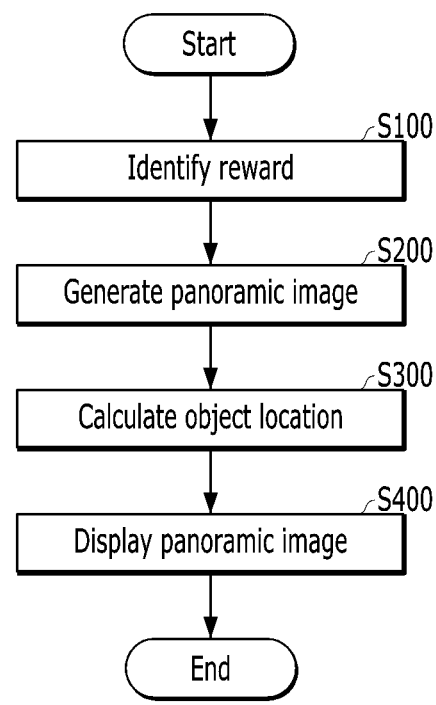
FIG. 4 is a flowchart illustrating a method for producing panoramic image content performed by a system for producing panoramic image content of FIG. 1.

FIG. 4 is a flowchart illustrating a method for producing panoramic image content performed by a system for producing panoramic image content of FIG. 1.

Referring to FIG. 4, a method for producing panoramic image content includes a reward identification operation S100, a panoramic image generation operation S200, an object location calculation operation S300, and a panoramic image display operation S400.

First, at the reward identification operation S100, the panoramic image server 200 calculates an expected imaging reward PR based on user location information that is location information of the user device 100 and reward reference data CD, transmits the expected imaging reward PR to the user device 100, and displays the expected imaging reward PR received by the user device 100.

In this case, pre-stored tag data $TD_S$ and new tag data $TD_1$ include imaging origin information SI on a location in which the panoramic image I is shot and object location information OI on an individual object.

Further, the reward reference data CD includes at least one reference of imaging viewing angle information on the object pre-stored based on the pre-stored panoramic image data $ID_S$ and the pre-stored tag data $TD_S$, a distance between an imaging origin based on the imaging origin information SI and the object location based on the object location information OI, the number of pieces of the pre-stored tag data $TD_S$ with respect to the object, imaging information $I_D$, and user information of the user device 100.

Next, at the panoramic image generation operation S200, the user device 100 generates a first panoramic image data $ID_1$ including a first panoramic image $I_1$ and imaging information and a first tag data set $DS_1$ including the new tag data $TD_1$ with respect to at least one object being deployed on the first panoramic image $I_1$.

Figure 5:
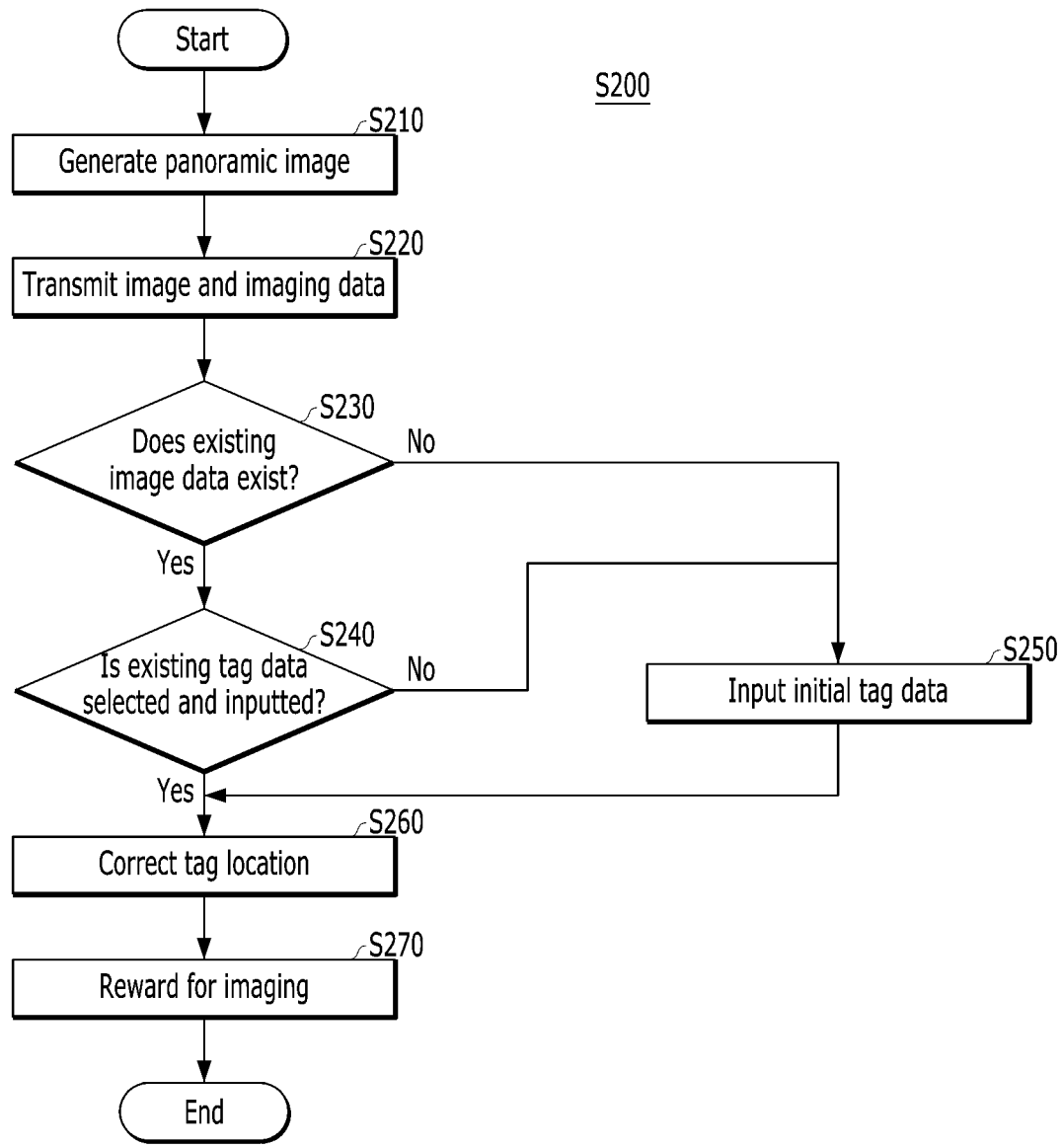
FIG. 5 is a flowchart illustrating in detail a panoramic image generation operation in a method for producing panoramic image content of FIG. 4.

Referring to FIG. 5, the panoramic image generation operation S200 includes a panoramic imaging operation S210, an image and imaging data transmission operation S220, an existing image data existence determination operation S230, a tag information input determination operation S240, an initial tag data input operation S250, a tag location correction operation S260, and an imaging reward operation S270.

First, at the panoramic imaging operation S210, the user device 100 shoots the first panoramic image $I_1$, and generates the first panoramic image data $ID_1$ including the first panoramic image $I_1$ and the imaging information.

Next, at the image and imaging data transmission operation S220, the user device 100 transmits the first panoramic image data $ID_1$ to the panoramic image server 200.

Next, at the existing image data existence determination operation S230, the user device 100 determines existence/nonexistence of the pre-stored panoramic image data $ID_S$ existing in the predetermined region based on the first panoramic image data $ID_1$.

Next, if the pre-stored panoramic image data $ID_S$ exists in the predetermined region based on the first panoramic image data $ID_1$, the user device 100, at the tag information input determination operation S240, inputs the tag information of the new tag data $TD_1$ based on the tag information of the pre-stored tag data $TD_S$.

If the pre-stored panoramic image data $ID_S$ does not exist in the predetermined region based on the first panoramic image data $ID_1$, or the user device 100 does not input the tag information of the new tag data $TD_1$ based on the tag information of the pre-stored tag data $TD_S$, the user device 100, at the initial tag data input operation S250, directly receives an input of the tag information of the new tag data $TD_1$ from a user.

At the tag location correction operation S260, the user device 100 corrects the first tag data set $DS_1$ based on the image processing result of the first panoramic image data $ID_1$.

At the imaging reward operation S270, the user device 100 generates reward reference data CD in consideration of at least one of the pre-stored panoramic image data $ID_S$ existing in the predetermined region and the pre-stored tag data $TD_S$ based on the first panoramic image data $ID_1$ and the new tag data $TD_1$, and provides imaging reward IR for the first panoramic image data $ID_1$ and the new tag data $TD_1$ based on the reward reference data CD.

At the object location calculation operation S300, the panoramic image server 200 generates the united tag data UT by receiving the first panoramic image data $ID_1$ and the first tag data set $DS_1$ from the user device 100, searching for at least one pre-stored tag data $TD_S$ with respect to the same object existing in the predetermined region based on the imaging information of the first panoramic image data $ID_1$, and calculating the location of the object based on the pre-stored tag data $TD_S$ searched for with respect to the same object and the new tag data $TD_1$.

At the object location calculation operation S300, the panoramic image server 200 may calculate the location of the object by an average value of intersection points among a plurality of extension lines V being formed based on at least one piece of the pre-stored tag data $TD_S$ and the location information set of the new tag data $TD_1$.

In this case, the pre-stored tag data $TD_S$ and the new tag data $TD_1$ include imaging origin information SI on the location where the panoramic image is shot and object location information OI on an individual object. In this case, an extension line V is formed to extend from a connection line connecting an imaging origin based on one piece of the imaging origin information SI and an object location based on one piece of the object location information OI to each other.

At the object location calculation operation S300, if there are two or more location information sets of the pre-stored tag data $TD_S$ searched for with respect to the same object, the panoramic image server 200 generates the intersection points P of the extension lines with respect to the same object being formed based on the first and second parameters of the imaging origin information SI and the object location information OI, and generates the united tag data UT using the average value of values of the extension lines on which the intersection point meets a straight line of the third parameter vertically extending in a direction of the third parameter.

Figure 6:
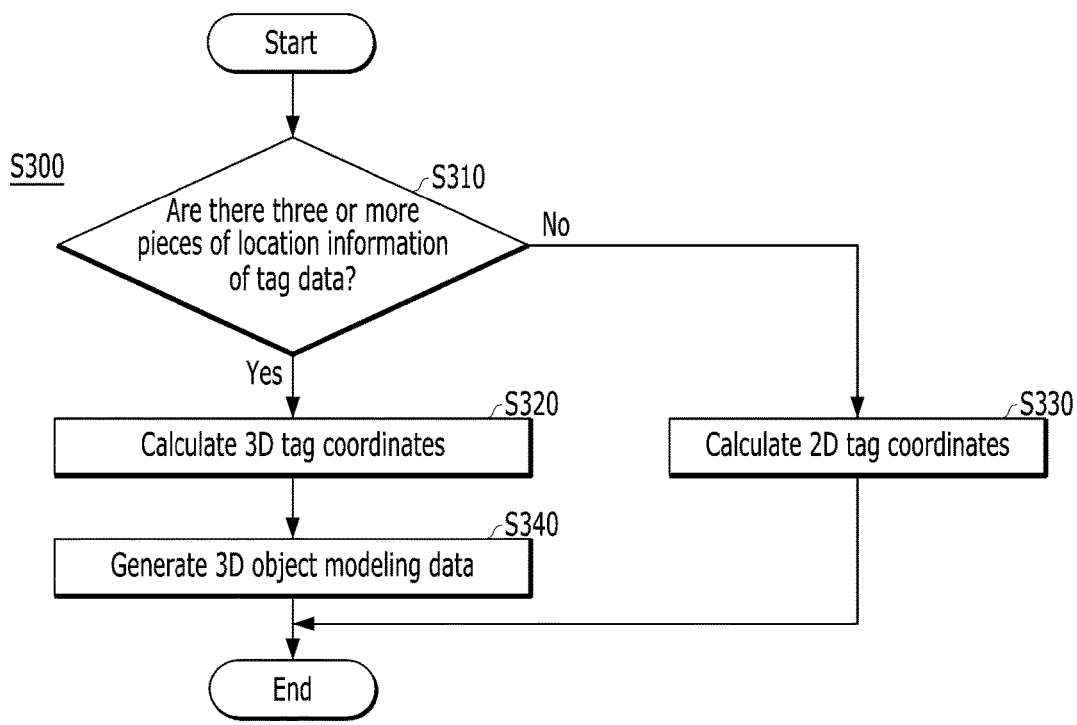
FIG. 6 is a flowchart illustrating in detail an object location calculation operation in a method for producing panoramic image content of FIG. 4.

Referring to FIG. 6, the object location calculation operation S300 includes a tag data determination operation S310, a 3D tag coordinate calculation operation S320, and a 2D tag coordinate calculation operation S330.

At the tag data determination operation S310, the panoramic image server 200 determines the number of location information sets of the pre-stored tag data $TD_S$ searched for with respect to the same object.

At the 3D tag coordinate calculation operation S320, if there are the two or more location information sets of the pre-stored tag data $TD_S$ searched for with respect to the same object, the panoramic image server 200 generates the united tag data UT using the average value of the intersection points P of the extension lines V with respect to the same object being formed based on the first to third parameters of the imaging origin information SI and the object location information OI.

At the 2D tag coordinate calculation operation S330, if there is one location information set of the pre-stored tag data $TD_S$ searched for with respect to the same object, the panoramic image server 200 generates the united tag data UT using the average value of the intersection points P of the extension lines V with respect to the same object being formed based on the first and second parameters of the imaging origin information SI and the object location information OI.

At 3D object modeling data generation operation S340, if there are the two or more location information sets of the pre-stored tag data $TD_S$ searched for with respect to the same object, the panoramic image server 200 generates an identification region surrounding the plurality of intersection points P and an object average point based on the average value of the intersection points P, and generates 3D model data of the object being deployed on the panoramic image I based on the identification region.

In this case, the object average point based on the average value is deployed in the center of the identification region, the size of the identification region may be in proportion to variances of the intersection points P, and the intersection point being located in a distance that is larger than a predetermined distance from the object average point based on the average value may be excluded from the identification region.

At the panoramic image display operation S400, the panoramic image server 200 displays the tag information on the object on the panoramic image data I based on the united tag data UT.

At the panoramic image display operation S400, the panoramic image server 200 displays the tag information of the united tag data UT on the first panoramic image data $ID_1$ and the pre-stored panoramic image data $ID_S$ respectively linked to a plurality of pieces of object reference information including the same tag information.

In this case, at the panoramic image display operation S400, the panoramic image server 200 may display the united tag data UT on the plurality of pieces of panoramic image data ID including the location information received by the panoramic image server 200 based on not only the first panoramic image data $ID_1$ and the pre-stored panoramic image data $ID_S$ but also the united tag data UT calculated from the first panoramic image data $ID_1$ and the pre-stored panoramic image data $ID_S$.

Figure 7:
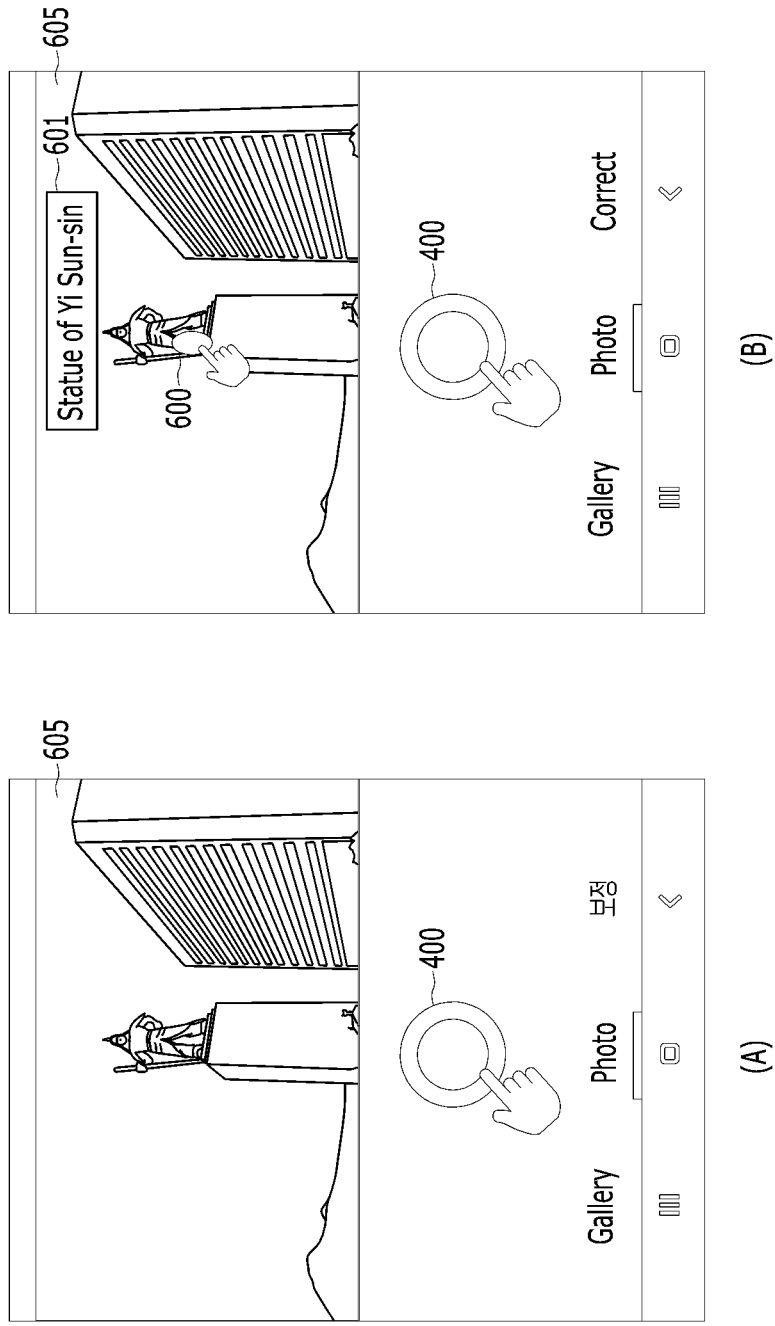
FIG. 7 is an exemplary diagram illustrating a panoramic image generation operation by a user device of FIG. 2.

FIG. 7 is an exemplary diagram illustrating a panoramic image generation operation by a user device of FIG. 2.

Referring to FIG. 7, at operation (A), a user can shoot a first panoramic image 605 using the user device 100.

In this case, the user performs an imaging operation for imaging the first panoramic image 605 using a shooting button 400 included on a displayed interface of the user device 100.

The user device 100 may shoot the first panoramic image 605 by performing all operations capable of generating not only a single image but also 360° and panoramic images and an application operation.

The user device 100 performs imaging of the first panoramic image 605, generates imaging information for imaging the first panoramic image 605, and generates the first panoramic image data $ID_1$ including the generated first panoramic image 605 and the imaging information.

At operation (B), the user device 100 may include an output unit 130 that displays the first panoramic image 605 of the first panoramic image data $ID_1$, and the user may deploy tag information 600 with respect to at least one object on the first panoramic image 605 through the input unit 120 of the user device 100.

If the user performs deployment of the tag information 600 with respect to the object on the first panoramic image 605, the user device 100 generates new tag data $TD_1$ with respect to the object.

In this case, the new tag data $TD_1$ includes the imaging origin information SI on the location in which the first panoramic image 605 is shot and the object location information OI on the object.

The user device 100 determines existence/nonexistence of the pre-stored panoramic image data $ID_S$ existing in the predetermined region based on the imaging information of the first panoramic image data $ID_1$ deployed and generated by the user.

If the pre-stored panoramic image data $ID_S$ exists, the user device 100 may display the pre-stored panoramic image data $ID_S$ and the tag information of the referred pre-stored tag data $TD_S$ through the output unit 130.

Exemplarily, names of the object that is the tag information included in the pre-stored tag data $TD_S$ may be displayed, and the user may select a reliable name from the tag information using the input unit 120 of the user device 100.

The user device 100 may preferentially display plural pieces of tag information with respect to the same object among the tag information of the plural pieces of the pre-stored tag data $TD_S$.

Exemplarily, in case that "Statue of Admiral Yi Sun-sin", "Image of Yi Sun-sin", and "Statue of Yi Sun-sin" exist as the tag information of the pre-stored tag data $TD_S$, and the tag information multiply input from other user devices 100 is "Statue of Yi Sun-sin", the tag information 601 on the "Statue of Yi Sun-sin" is preferentially displayed on the panoramic image I, and thus the user who uses the user device 100 can select a reliable name.

Further, in case that the pre-stored panoramic image data $ID_S$ does not exist in the predetermined region based on the first panoramic image data $ID_1$, or the user device 100 does not input the tag information of the new tag data $TD_1$ based on the tag information of the pre-stored tag data $TD_S$, the user device 100 may directly receive the tag information of the new tag data $TD_1$ from the user.

Exemplarily, the user device 100 may perform deployment of the object on the first panoramic image $I_1$ from the user, and thus the user can directly input the tag information of the deployed object to generate the initial new tag data in the predetermined region.

Thereafter, the user device 100 may generate newly the new tag data through receiving of the tag information of the pre-stored tag data $TD_S$ that is the initial new tag data from the panoramic image server 200.

Figure 8:
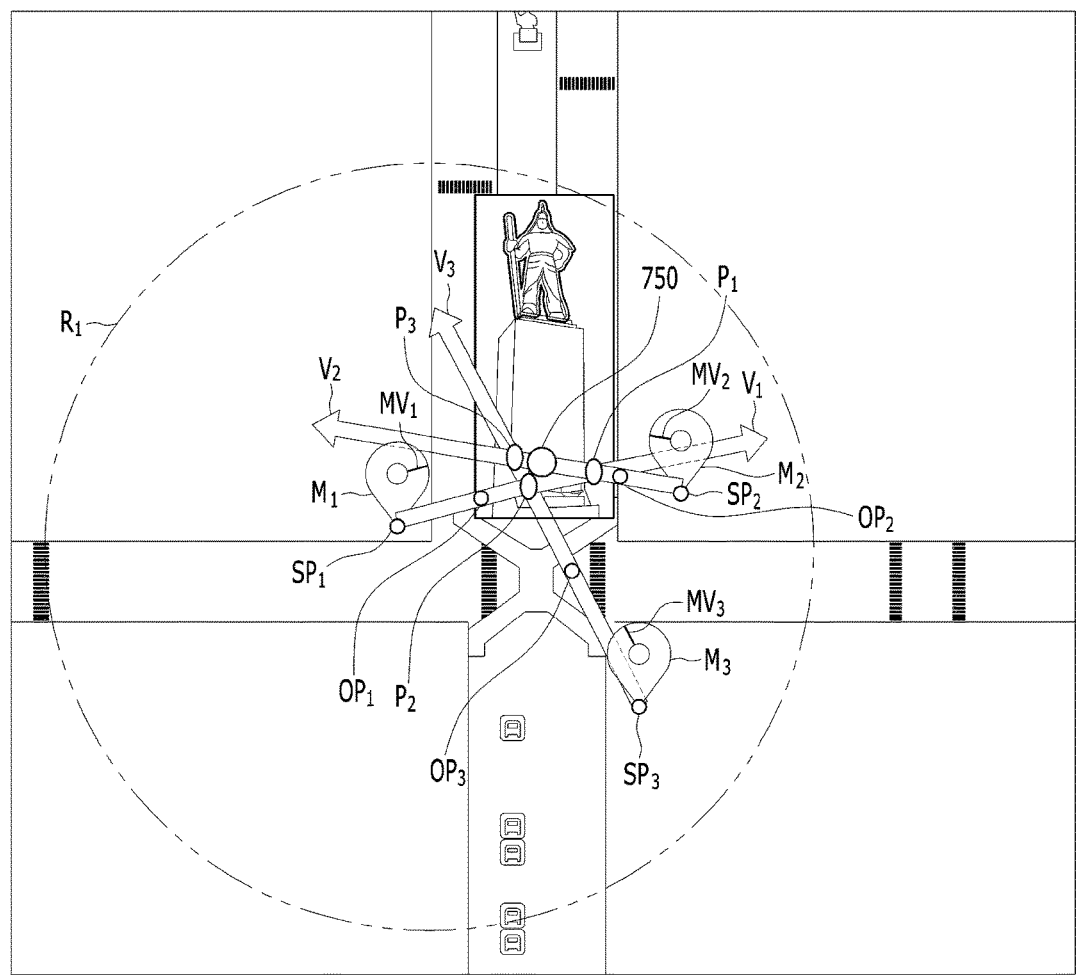
FIG. 8 is an exemplary diagram illustrating an object location calculation operation of a panoramic image server of FIG. 3.

FIG. 8 is an exemplary diagram illustrating an object location calculation operation of a panoramic image server of FIG. 3.

Referring to FIG. 8, pre-stored tag data $TD_2$ and $TD_3$ searched for with respect to the same object in the predetermined region $R_1$ is searched for based on the imaging information $I_D$ of the first panoramic image data $ID_1$, and three extension lines $V_1$, $V_2$, and $V_3$ are formed to extend from the connection line connecting imaging origins $SP_1$, $SP_2$, and $SP_3$ based on imaging origin information SI on the location in which the first panoramic image $I_1$, the second panoramic image $I_2$ that is a pre-stored panoramic image $I_S$, and the third panoramic image $I_3$ are shot and object locations $OP_1$, $OP_2$, and $OP_3$ that correspond to object location information OI on an individual object to each other.

In this case, united tag data 750 may be generated by generating intersection points $P_1$, $P_2$, and $P_3$ among a plurality of extension lines $V_1$, $V_2$, and $V_3$ and calculating the location of the object with an average value of the generated intersection points $P_1$, $P_2$, and $P_3$, and the user device 100 may receive the united tag data UT including the location information calculated by the panoramic image server 200 and the tag information, and may display the tag information on the object on the plurality of panoramic images I.

Further, referring to FIG. 8, the panoramic image server 200 may generate location markers $M_1$, $M_2$, and $M_3$ on a geometric information image based on the location information in which the plurality of panoramic image data $ID_1$, $ID_2$, and $ID_3$ are shot.

The panoramic image server 200 may provide the geometric information image on which the location markers $M_1$, $M_2$, and $M_3$ are created to the user device 100, and the output unit 130 of the user device 100 may display the geometric information image on which the location markers $M_1$, $M_2$, and $M_3$ are displayed to the user.

Further, the panoramic image server 200 may generate tag deployment directions $MV_1$, $MV_2$, and $MV_3$ in a specific region of the location markers $M_1$, $M_2$, and $M_3$ based on the tag data $TD_1$, $TD_2$, and $TD_3$ of the plurality of panoramic image data $ID_1$, $ID_2$, and $ID_3$.

Exemplarily, on the third marker $M_3$ corresponding to the third panoramic image data $ID_3$, the tag deployment direction $MV_3$ in a direction of 11 o'clock, which is the direction from the imaging origin $SP_3$ based on the imaging origin information SI of the third tag data $TD_3$ to the object location $OP_3$ that is the object location information OI, may be formed in a specific region of the third location marker $M_3$.

Further, the panoramic image server 200 may create united tag data 750 generated through calculation of the location of the object with the average value of the intersection points $P_1$, $P_2$, and $P_3$ on the geometric information image.

In this embodiment, the configuration, in which the panoramic image server 200 generates the location marker M and the united tag data UT on the geometric information image, and the user device 100 receives and displays the geometric information image, has been described, but in another embodiment, the user device 100 may receive the location marker M and the united tag data UT, and may generate the location marker and the united tag data on the geometric information image.

By displaying the geometric information image on which the location marker M and the united tag data UT are created through the output unit 130, the user can easily grasp, from a plurality of users, the location in which the panoramic image I is shot and the location and the direction in which the tag information of the united tag data UT is deployed.

Figure 9:
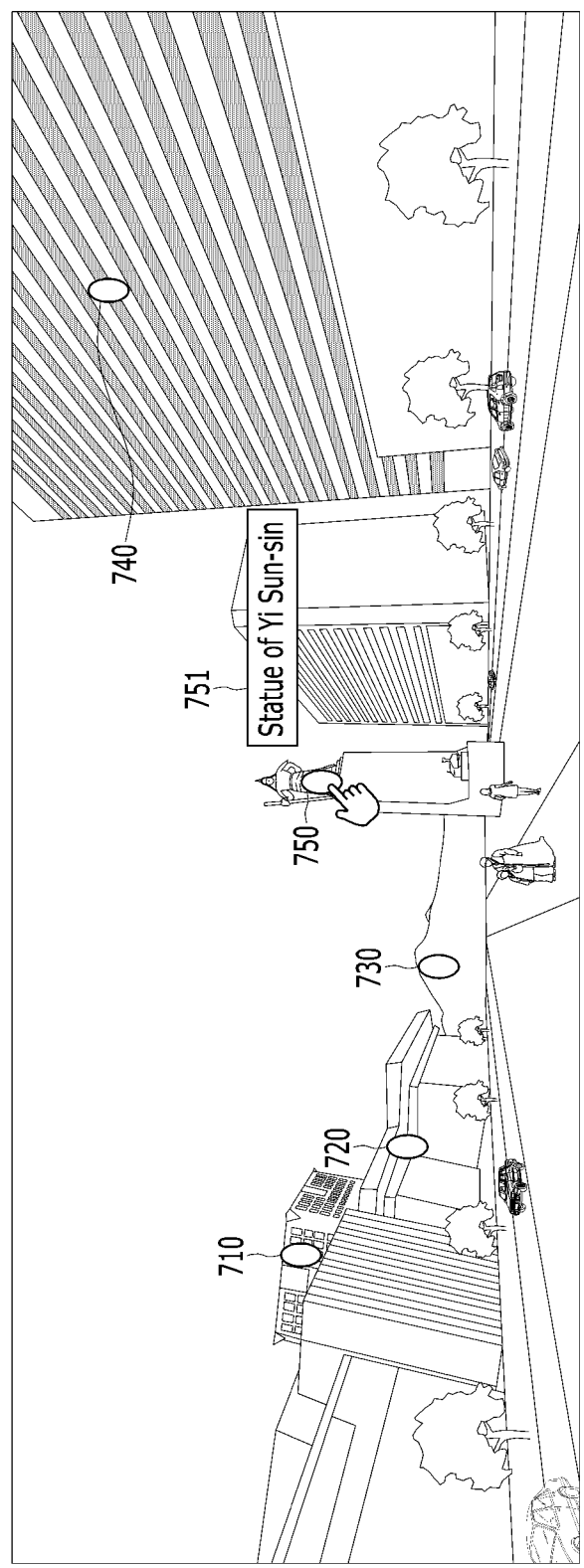
FIG. 9 is an exemplary diagram of a user interface for displaying tag information based on united tag data for an object in a user device of FIG. 2.

FIG. 9 is an exemplary diagram of a user interface for displaying tag information based on united tag data for an object in a user device of FIG. 2.

Referring to FIG. 9, the user device 100 may display tag information 710, 720, 730, 740, and 750 of united tag data UT with respect to a plurality of objects being deployed on a plurality of panoramic images I from the panoramic image server 200.

The united tag data UT is generated based on new tag data $TD_1$ received with respect to the same object from the user devices 100, imaging origin information SI included in pre-stored tag data $TD_S$, and object location information OI.

If the user of the user device 100 selects the tag information 710, 720, 730, 740, and 750 of the united tag data UT with respect to the objects, the user device 100 may display a deployed name 751 of the tag information corresponding to the united tag data UT, regional information corresponding to the object location information OI, object information, and object environment information, and the tag information 710, 720, 730, 740, and 750 of the united tag data UT may be linked to the object information or the panoramic image adjacent to the object to be provided to the user.

The user device 100 may display the tag information 710, 720, 730, 740, and 750 of the united tag data UT on the panoramic image in the form of selectable icons, markers, and tags, and the tag information of the united tag data UT may be displayed to the user in the form of an outline and 3D-modeled 3D object generated based on the object location information OI and the result of recognizing the object of the panoramic image I.

Because the user device 100 deploys the tag information using the recognized object and the object location information OI, accurate object location information OI of the shot object included in the panoramic image I can be obtained, and the deployment of the tag information 710, 720, 730, 740, and 750 on the panoramic image I can also be precisely performed based on the object location information OI.

Further, because the shot object related to the united tag data UT is displayed by an outline to be provided to the user, the user can grasp the shot object included in the image more intuitively.

According to the united tag data UT, as the new tag data $TD_1$ with respect to the same object from a plurality of user devices 100 is accumulated, the locations of the tag information 710, 720, 730, 740, and 750 with respect to the corresponding object can be accurately displayed on the panoramic image I.

Further, as the distance from the imaging origin to the object location becomes longer, the sizes of the tag information 710, 720, 730, 740, and 750 of the united tag data UT on the panoramic image I become smaller.

Figure 10:
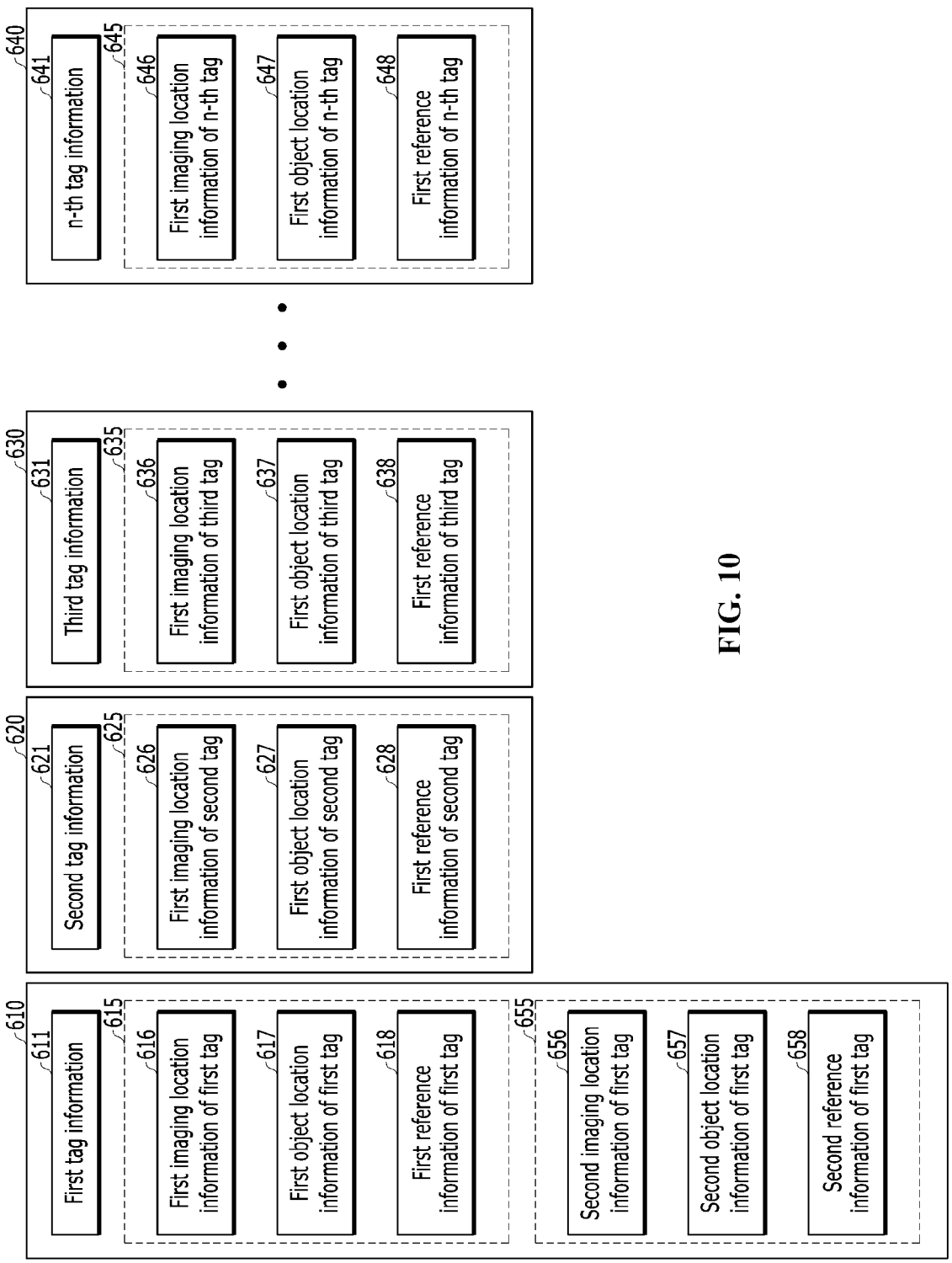
FIG. 10 is an exemplary diagram illustrating tag data stored in a panoramic image server of FIG. 3.

FIG. 10 is an exemplary diagram illustrating tag data stored in a panoramic image server of FIG. 3.

Referring to FIG. 10, the panoramic image server 200 may store pre-stored tag data $TD_S$ and new tag data $TD_1$ of a plurality of objects different from one another.

Here, the pre-stored tag data $TD_S$ is illustrated, which includes plural pieces of tag information 611, 621, 631, and 641 and location information sets 615, 625, 635, and 645 shot from the imaging origin of first imaging origin information 616, 626, 636, and 646.

Further, the new tag data $TD_1$ is illustrated, which includes the first tag information 611 and the second imaging origin information 616 shot from the location that is different from the location of the pre-stored tag data $TD_S$.

In this case, the panoramic image server 200 may generate the united tag data 610 including the plurality of location information sets 615 and 655 obtained by imaging the objects having the same first tag information 611 from different locations, respectively.

That is, the united tag data UT includes the tag information with respect to one object and two or more location information sets deployed on the panoramic image I.

The location information set includes imaging origin information SI that is the location in which the panoramic image is shot, one piece of object location information OI for deploying the user device 100 on the panoramic image, first panoramic image data $ID_1$ for imaging the location information set and the corresponding object, and object reference information RI including link information with the pre-stored panoramic image data $ID_S$.

Exemplarily, the panoramic image server 200 may generate the united tag data 610 by calculating the location of the object based on first and second imaging origin information 616 and 656 of the first tag information 611 and first and second object location information 617 and 657 of the first tag information 611, and may display the first tag information 611 with respect to the object on the pre-stored panoramic image data $TD_S$ and the new panoramic image data $TD_1$ linked to the first and second object reference information 618 and 658 of the first tag information based on the generated united tag data 610.

Further, the panoramic image server 200 may display the second to n-th tag information 621, 631, and 641 on the pre-stored panoramic image $I_S$ based on the location information sets 625, 635, and 645 on the pre-stored panoramic image $I_S$.

In this case, the first tag information 611 may be displayed on the pre-stored panoramic image $I_S$ and the first panoramic image $I_1$ using the imaging origin information 616 and 656 and the object location information 617 and 657 included in the plurality of location information sets 615 and 655, or may be selectively displayed on the panoramic image I using any one of the location information sets 615 and 655 that is the location information in which each of the user device 100 deploys the object.

Although the embodiments have been described in the limited description and drawings, it should be understood by those of ordinary skill in the art to which the present disclosure pertains that various corrections and modifications can be made from the above description. For example, proper results can be achieved even if the described technologies are performed in a different order from the order of the described method, and/or constituent elements, such as the described system, structure, device, and circuit, are coupled or combined in a different form from the form of the described method, or the constituent elements are replaced by or substituted for other constituent elements or equivalents. Accordingly, other implementations, other embodiments, and equivalents of appended claims belong to the scope of the claims, which will be described later.

The forms for embodying the present disclosure have been described together with the best form for embodying the present disclosure as described above.

The present disclosure relates to a system and a method for producing panoramic image content, and thus the present disclosure is applicable to various apparatuses and methods for producing the panoramic image content, and has industrial applicability with repeatability.

What is claimed is:

1. A system for producing panoramic image content, comprising:
   a user device generating first panoramic image data including a first panoramic image and imaging information, and including a first tag data set having new tag data for at least one object, including a first object, deployed on a first panoramic image, the user device including a display; and
   a panoramic image server including a memory having instructions executed by a processor causing the processor to perform a method of:
      receiving the first panoramic image data and the first tag data set from the user device;
      searching for at least one pre-stored tag data, with respect to the first object, existing in a predetermined region, based on the imaging information of the first panoramic image data;
      generating united tag data by calculating a location of the first object, based on the pre-stored tag data searched for with respect to the first object and the new tag data; and
      adding tag information of the first object to the panoramic image data based on the united tag data, wherein:
         the pre-stored tag data and the new tag data comprise imaging origin information SI on a location in which the first panoramic image is shot and object location information on the first object,
         an extension line is formed to extend from an end of a connection line that connects an imaging origin SP, based on one piece of the imaging origin information SI, to a first object location, based on one piece of the first object location information,
         an object location determination module calculates the location of the first object by an average value of intersection points among a plurality of extension lines being formed, based on at least one piece of the pre-stored tag data and a location information set of the new tag data, and determines a number of location information sets of the pre-stored tag data searched for with respect to the first object,
         the imaging origin information SI and the first object location information comprise a first parameter, a second parameter, and a third parameter for the first object location,
         the object location determination module generates the united tag data using the average value of the intersection points of the extension lines being formed with respect to the first object, based on the first to third parameters of the imaging origin information SI and based on the first object location information in case that there are two or more location information sets of the pre-stored tag data searched for by the panoramic image server with respect to the first object, and wherein
         the object location determination module generates the united tag data using the average value of the intersection points of the extension lines being formed with respect to the first object, based on the first and second parameters of the imaging origin information SI and based on the first object location information in case that there is one location information set of the pre-stored tag data searched for by the panoramic image server with respect to the first object.

2. The system of claim 1, wherein in case that there are the two or more location information sets of the pre-stored tag data searched for with respect to the first object, the panoramic image server generates an identification region surrounding the plurality of intersection points, generates an object average point based on the average value of the intersection points, and generates 3D model data of the first object being deployed on the panoramic image based on the identification region.

3. The system of claim 2, wherein the object average point based on the average value is deployed in a center of the identification region, and a size of the identification region is in proportion to variances of the intersection points.

4. The system of claim 2, wherein when an intersection point is located a distance that is larger than a predetermined distance from the object average point, such intersection point is excluded from the identification region.

5. The system of claim 1, wherein the imaging origin information SI and the object location information comprise the first parameter, the second parameter, and the third parameter for the first object location, and wherein
   the object location determination module determines the number of location information sets of the pre-stored tag data searched for with respect to the first object, the generating of the intersection points of the extension lines being formed with respect to the first object is based on the first parameter and the second parameter of the imaging origin information SI and based on the object location information in case that there are two or more location information sets of the pre-stored tag data searched for with respect to the first object, and the generating of the united tag data uses the average value of values of extension lines for which the intersection point meets a straight line of the third parameter vertically extending in a direction of the third parameter.

6. A method for producing panoramic image content using a system for producing panoramic image content including a user device having a display and generating panoramic image data and tag data and including a panoramic image server receiving the panoramic image data and the tag data from the user device, the method comprising:
generating, by the user device, first panoramic image data including a first panoramic image and imaging information and a first tag data set including new tag data for at least one object, including a first object, deployed on the first panoramic image;
calculating a first object location which generates, by the panoramic image server, united tag data by receiving the first panoramic image data and the first tag data set from the user device, by searching for at least one pre-stored tag data with respect to the first object existing in a predetermined region, based on the imaging information of the first panoramic image data, and by calculating the location of the first object based on the pre-stored tag data searched for with respect to the first object and the new tag data; and
displaying, on the display of the user device, the panoramic image which displays, from the panoramic image server, tag information on the first object using the panoramic image data based on the united tag data, wherein:
the pre-stored tag data and the new tag data include imaging origin information SI on a location in which the first panoramic image is shot and object location information on the first object;
an extension line is formed to extend from a connection line, connecting an imaging origin SP, based on one piece of the imaging origin information SI, and one piece of the first object location, based on one piece of the first object location information, to each other, the calculating of the first object location comprises calculating, by the panoramic image server, the location of the first object by using an average value of intersection points among a plurality of extension lines being formed, based on at least one piece of the pre-stored tag data and a location information set of the new tag data;
the imaging origin information SI and the object location information include a first parameter, a second parameter, and a third parameter for the first object location, and the calculating of the first object location comprises:
determining a tag data which determines, by the panoramic image server, a number of location information sets of the pre-stored tag data searched for with respect to the first object;
calculating a 3D tag coordinate which generates, by the panoramic image server, the united tag data using the average value of the intersection points of the extension lines being formed with respect to the first object, based on the first to third parameters of the imaging origin information and based on the first object location information in case that there are two or more Location information sets of the pre-stored tag data searched for with respect to the first object; and
calculating a 2D tag coordinate which generates, by the panoramic image server, the united tag data using the average value of the intersection points of the extension lines being formed with respect to the first object, based on the first and second parameters of the imaging origin information and based on the first object location information in case that there is one location information set of the pre-stored tag data searched for with respect to the first object.

7. The method of claim 6, wherein the calculating of the first object location comprises:
generating the intersection points of the extension lines being formed, with respect to the first object, based on the first parameter and the second parameter of the imaging origin information and based on the first object location information in case that there are two or more location information sets of the pre-stored tag data searched for with respect to the first object; and
generating the united tag data using the average value of values of the extension lines on which the intersection point meets a straight Line of the third parameter vertically extending in a direction of the third parameter.

* * * * *